Sept. 4, 1934.   L. J. LESH   1,972,268
INTERFERENCE SUPPRESSOR
Filed Dec. 30, 1932
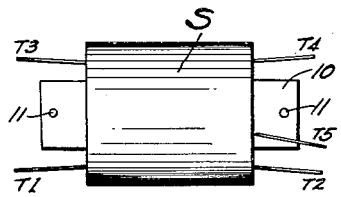
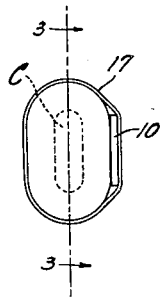
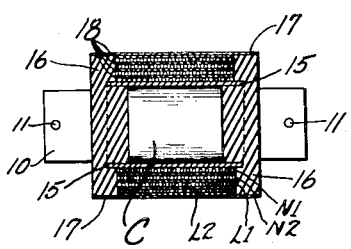
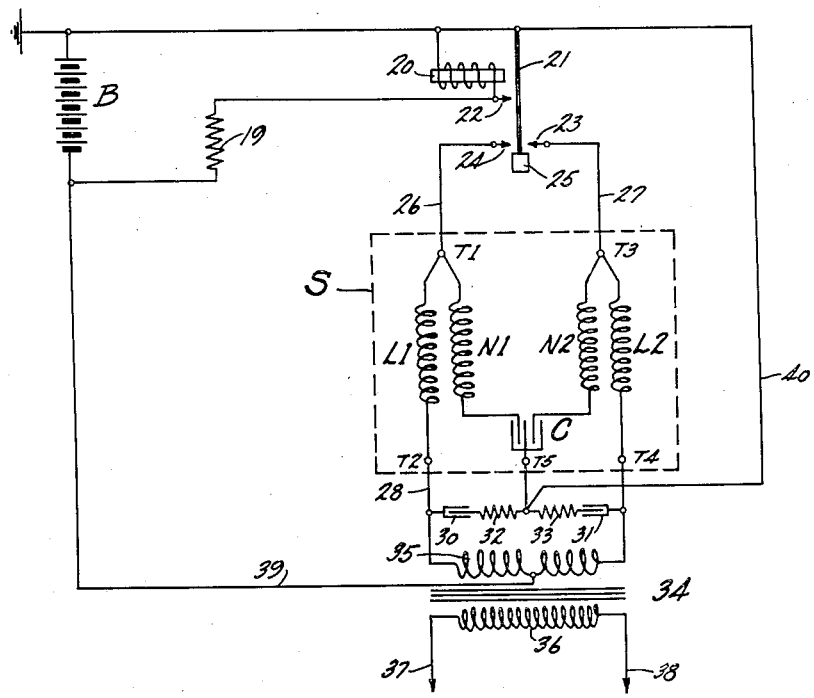

Patented Sept. 4, 1934

1,972,268

UNITED STATES PATENT OFFICE 1,972,268

INTERFERENCE SUPPRESSOR

Laurence J. Lesh, Chicago, Ill., assignor, by mesne assignments, to Associated Electric Laboratories, Inc., Chicago, Ill., a corporation of Delaware Application December 30, 1932, Serial No. 649,488

4 Claims. (Cl. 178—44)

The present invention relates in general to interference suppression and the main object of the invention is the provision of an improved suppression device which will satisfactorily suppress or eliminate interfering radio-frequency waves which are emanated from circuit-opening or -closing contacts or other sources of radio-frequency interference.

According to a particular feature of the invention, the suppressor comprises a number of coils and a condenser formed into a small compact unit so that it may be easily attached to the source of interference and requires very little space.

According to another feature of the invention, the efficiency of the device in suppressing undesirable radiation is very high while at the same time the impedance of the coils to useful output current is exceedingly small, thereby greatly reducing the ill effects of inserting the suppressor in the line or circuit conductors leading from the contacts or other source of interference to which the suppressor is applied.

Another feature is a pronounced decrease in the sparking at the contacts when the improved suppressor is used, which in many cases makes it unnecessary to provide separate spark condensers.

The above and other objects and features of the invention will be more clearly understood from the following specification when read in connection with the accompanying drawing, which shows one form of the present invention and in which Fig. 1 is a top view of the complete radio interference suppressor of the present invention;

Fig. 2 is an end view of the suppressor;

Fig. 3 is a cross section along the line 3—3 of Fig. 2 except that the condenser C is not shown in cross section; and Fig. 4 is a circuit diagram of a vibrator type ringing converter, such as is in common use in telephone systems, with the improved interference suppressor of the present invention applied thereto.

Referring first to the circuit diagram of Fig. 4, the vibrating type ringing converter comprises a vibratory armature 21 driven by the magnet 20. The circuit to the magnet is normally closed, extending from the positive or grounded pole of battery B, winding of magnet 20, resistance 19, to the negative pole of battery B. The magnet energizes and attracts the vibratory armature 21, closing contact 22 and thereby short-circuiting the winding of magnet 20. Resistance 19 is provided to prevent the short-circuiting of battery B. The magnet deenergizes, allowing the armature to restore and open contact 22, whereupon the short circuit is removed from the winding of the magnet and it again energizes. Thus the armature is kept vibrating and as it vibrates it alternately closes contacts 24 and 23.

The alternate closing of contacts 24 and 23 alternately completes the circuits through the left and right halves of the primary winding 35 of transformer 34. These circuits extend from the grounded positive pole of battery B, armature 21, contact 24, conductor 26, coil L1 of the suppressor, conductor 28, left-half of winding 35, conductor 39 to the negative pole of the battery, and from the positive pole of battery B, armature 21, contact 23, conductor 27, coil L2 of the suppressor, conductor 29, right half of winding 35, conductor 39, to the negative pole of the battery. Current through the two halves of winding 35 alternately and in opposite directions induces an alternating current in the secondary winding 36 which supplies ringing current to the telephone equipment over leads 37 and 38. Condensers 30 and 31 and resistances 32 and 33 may be provided to eliminate sparking at the contacts of the converter.

The radio interference suppressor S may be connected in the leads extending from the contacts of the ringing converter to the primary winding 35 of transformer 34 in the manner shown in Fig. 4. The two line coils L1 and L2 are connected in the two line conductors, respectively, while the neutralizing windings N1 and N2 are bridged across the line conductors in series with two plates of a three-plate condenser C, the third plate of the condenser being connected to ground over conductor 40. Obviously, two ordinary two-plate condensers can be used in place of the three-plate condenser, but the latter is advised because of the more compact structure which can be obtained.

The construction of the suppressor unit S and the manner in which the four coils of the unit are inductively related will be clear from an inspection of Figs. 1 to 3, inclusive, of the drawing. The condenser C may be of the well-known telephone condenser construction—that is, it is formed of a plurality of turns of tinfoil and paper strips, each turn in the condenser used in the present case consisting of three layers of tinfoil to form the three plates of the condensers and six layers of paper, two layers of paper between each two layers of tinfoil.

The suppressor coils are wound upon a collapsible mandrel. Four or five turns of empire cloth or other suitable material are first wound upon the mandrel to form a core 15 for the coil windings. The first winding N1 is then wound on this core, followed by windings N2, L1, and L2 in the order named. Each winding consists of a single layer of turns and the windings are wound one over the other, all in the same direction, each winding is separated from the others by a layer of empire cloth 18. The coil structure is then removed from the mandrel and the condenser C, constructed as described above, is inserted in the center of the core. The ends are then filled in with block condenser wax as shown at 16 to form a solid cylindrical structure. A phenol fiber strip 10 having a hole 11 at each end thereof to facilitate the mounting of the suppressor is then taped to the side of the unit by means of ordinary adhesive tape 17. This securely holds the mounting strip to the unit and also provides mechanical protection for the coils.

The connections of the coils and condenser are shown in Fig. 4 of the drawing. The beginning or starting ends of coils L1 and N1 are connected together and brought out as lead or terminal T1. Similarly, the starting ends of coils L2 and N2 are connected together and brought out as lead or terminal T3. The other ends of coils L1 and L2 are brought out as leads T2 and T4, respectively. The other ends of coils N1 and N2 are connected to two plates of the three-plate condenser C and the third plate of the condenser is connected to lead or terminal T5. Thus all four coils are connected so as to be inductively aiding as regards parallel circuits from the vibrator contacts; that is, all coils are wound in the same directions starting with terminals T1 and T3.

The improved radio interference suppressor, when constructed as above described and with the coils in the inductive relation indicated, has been found to be much more effective than known suppressors. The line coils L1 and L2 may have a very low impedance compared to the line coils in other known suppressors. It has been found that the resistance of these line coils may be as low as 0.37 ohm each. This is of great advantage since it is extremely important that the impedance of the line or output circuit of a device be kept as low as possible to prevent loss and a corresponding reduction in the efficiency of the device.

The above result—that is, the effective operation of the suppressor with the low impedance line coils—may be due to the opposed E. M. F. induced in coils L1 and L2 by current in the neutralizing windings N1 and N2. It is thought that some of the radio-frequency interfering currents produced at the interrupter contacts pass through coils N1 and N2 and through condenser C. These currents through windings N1 and N2 have a tendency to induce an E. M. F. in windings L1 and L2. This induced E. M. F. is in such a direction as to oppose interfering currents attempting to pass through coils L1 and L2 and out on the line conductors. This opposed E. M. F. in coils L1 and L2 therefore functions as additional impedance and permits the use of the low impedance coils in the line conductors as explained above.

What is claimed is:

1. The combination, with a ringing current generator, of means for suppressing radio frequency radiation, said means comprising two inductive windings, one in series with each of the output leads from said generator, two other inductive windings and a condenser connected in bridge of said leads on the generator side of said first windings, said windings all being in inductive relation to each other, said condenser being of the three-plate type, and a connection from the middle plate of said condenser to ground.

2. The combination, with a pair of switch contacts intermittently interrupting an electrical circuit over a pair of conductors, of means for suppressing radio frequency radiation by the conductors of said circuit caused by such interruptions, said means comprising an inductive winding connected in series with each conductor adjacent to said contacts, and a second inductive winding in inductive relation with each of said first windings, said second windings connected in bridge of said pair of contacts.

3. An arrangement for suppressing radio frequency radiation as set forth in claim 2, in which a condenser is connected in series with the second inductive windings.

4. A radio frequency suppressor comprising a hollow core of insulating material, a three-plate condenser contained within said core, four single-layer coils wound on said core in superposed relation, all said coils being wound in the same direction, a terminal connected to the beginning of coils 1 and 3, a second terminal connected to the beginning of coils 2 and 4, two other terminals connected to the ends of coils 3 and 4, respectively, connections from the ends of coils 1 and 2 to the two outside plates of said condenser, and a fifth terminal connected to the center plate of said condenser.

LAURENCE J. LESH.